United States Patent
Hwang et al.

(10) Patent No.: US 11,396,247 B2
(45) Date of Patent: Jul. 26, 2022

(54) ELECTRICALLY POWERED SLIDING UNIT FOR VEHICLE

(71) Applicants: Hyundai Motor Company, Seoul (KR); KIA Motors Corporation, Seoul (KR)

(72) Inventors: Jin Ho Hwang, Cheonan-si (KR); Dong Eun Cha, Hwaseong-si (KR); Sang Heon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/167,562

(22) Filed: Feb. 4, 2021

(65) Prior Publication Data

US 2022/0080861 A1 Mar. 17, 2022

(30) Foreign Application Priority Data

Sep. 15, 2020 (KR) .................. 10-2020-0118488

(51) Int. Cl.
*B60N 2/02* (2006.01)
*B60R 7/04* (2006.01)
*B60N 2/06* (2006.01)
*B60N 2/07* (2006.01)

(52) U.S. Cl.
CPC .......... *B60N 2/0232* (2013.01); *B60N 2/067* (2013.01); *B60N 2/0722* (2013.01); *B60R 7/04* (2013.01)

(58) Field of Classification Search
CPC .... B60N 2/0232; B60N 2/067; B60N 2/0722; B60N 2/04; B60N 2/07; B60N 2/06; B60N 2/062; B60N 2/065

USPC ................................ 248/424, 425, 429, 430
See application file for complete search history.

(56) References Cited

U.S. PATENT DOCUMENTS

| 3,636,883 | A | * | 1/1972 | Wesener | B61L 23/005 104/50 |
| 3,964,206 | A | * | 6/1976 | Bernhard | A63H 18/12 446/455 |
| 4,386,777 | A | * | 6/1983 | Prehodka | A63H 18/028 104/281 |
| 6,101,952 | A | * | 8/2000 | Thornton | B60L 13/003 104/130.02 |
| 6,457,765 | B1 | * | 10/2002 | Bergquist | B60N 2/01 296/64 |

(Continued)

FOREIGN PATENT DOCUMENTS

KR 10-1468617 B1 12/2014

*Primary Examiner* — Nkeisha Smith
(74) *Attorney, Agent, or Firm* — Morgan, Lewis & Bockius LLP (57) ABSTRACT

A sliding unit for a vehicle includes: a rail including a first extension part, a second extension part, and a bending part connecting the first extension part and the second extension part; a movable part slidably disposed on the rail, and including a magnetic part configured to be locked with or unlocked from the rail; a power supply part disposed in the rail, having a shape extending in a lengthwise direction along the rail, and electrically connected to a power source of the vehicle; and a first contact part and a second contact part disposed in the movable part, and electrically connecting the power supply part and the magnetic part when contacting the power supply part.

15 Claims, 4 Drawing Sheets

(56) References Cited

U.S. PATENT DOCUMENTS

| | | | |
|---|---|---|---|
| 6,899,035 B2* | 5/2005 | Zorn | B60L 5/005 |
| | | | 104/130.01 |
| 7,677,629 B2* | 3/2010 | Akiya | B60N 2/0705 |
| | | | 296/64 |
| 8,857,763 B2* | 10/2014 | Brand | B60N 2/075 |
| | | | 244/118.5 |
| 8,967,051 B2* | 3/2015 | King | B60L 13/10 |
| | | | 104/284 |
| 9,219,359 B2 | 12/2015 | Sekino et al. | |
| 9,381,876 B2 | 7/2016 | Terada et al. | |
| 9,573,536 B2 | 2/2017 | Katou et al. | |
| 9,627,129 B2* | 4/2017 | Abe | H02J 5/005 |
| 9,783,081 B2* | 10/2017 | Saucier | B60N 2/0228 |
| 10,414,314 B2* | 9/2019 | Leck | B60N 2/06 |
| 10,717,374 B2* | 7/2020 | Kim | B60N 2/015 |
| 2007/0158969 A1* | 7/2007 | Walkingshaw | B60N 2/0737 |
| | | | 296/64 |
| 2010/0236445 A1* | 9/2010 | King | E01B 25/34 |
| | | | 104/130.03 |
| 2013/0074724 A1* | 3/2013 | King | B60L 13/003 |
| | | | 104/130.02 |
| 2018/0334054 A1 | 11/2018 | Higuchi et al. | |
| 2021/0170919 A1* | 6/2021 | Tseng | F16C 29/063 |

* cited by examiner

ELECTRICALLY POWERED SLIDING UNIT FOR VEHICLE

CROSS REFERENCE TO RELATED APPLICATION

The present application claims the benefit of priority to Korean Patent Application No. 10-2020-0118488 filed on Sep. 15, 2020 in the Korean Intellectual Property Office, the entire contents of which is incorporated herein for all purposes by this reference.

TECHNICAL FIELD

The present disclosure relates to a sliding unit for a vehicle, in which a movable part coupled to a seat, a console, or the like of the vehicle can be moved along a rail, the movable part is locked with or unlocked from a rail along a magnetic path of a magnetic part provided in the movable part, and electric power is supplied to the magnetic part, the seat, the console, or a table from the rail.

BACKGROUND

A car seat may be adjusted in the forward/backward direction such that the seat conforms to the occupant's physical condition, or spaces can be secured behind and in front of the seat. According to a conventional method, a user needs to manually operate a lever such that the seat slides forwards/backwards along rails provided on the floor of the vehicle, and the seat can be fixed after sliding.

There has recently been development of various types of power seats, which are made to slide forwards/backwards by pressing buttons.

In large, power seats require driving systems and locking mechanisms. Conventional driving systems and locking devices have complicated structures and occupy large spaces, and also require complicated wiring structures for power supply.

Therefore, there is a need for electrically powered rails which have a simple structure such that the same occupy minimum spaces and can be supplied with power in a simple manner, and which can be easily applied to various parts (for example, seats, consoles, etc.) inside the vehicle.

The above description regarding the background art is only for helping understanding of the background of the present disclosure, and is not to be regarded by a person skilled in the art as corresponding to already-known prior arts.

SUMMARY

The present disclosure has been proposed to solve the above-mentioned problems, and provides a sliding unit for a vehicle, wherein a locking mechanism is implemented by using a magnetic part such that a movable part can slide along a simple and slim rail and can be locked with or unlocked from the rail, the movable part can be coupled to various devices other than seats, electric power is supplied from the rail to the magnetic part, a seat, a console, or a table, and the sliding unit is widely available inside the vehicle.

A sliding unit for a vehicle according to an aspect of the present disclosure includes: a rail including a first extension part, a second extension part, and a bending part connecting the first extension part and the second extension part in a way that the first and second extension parts are perpendicularly connected to each other; a movable part slidably disposed on the rail along the rail, and including a magnetic part locked with or unlocked from the rail; a power supply part disposed in the rail, having a shape extending in a lengthwise direction along the rail, and electrically connected to a power source of the vehicle; and a first contact part and a second contact part disposed in the movable part, and electrically connecting the power supply part and the magnetic part when contacting the power supply part of the rail. The power supply part includes a first power supply part disposed on the first extension part and a second power supply part disposed on the second extension part, and the first contact part and the first power supply part contact each other when the movable part is slid along the first extension part. The second contact part and the second power supply part contact each other when the movable part is slid along the second extension part.

The first contact part and the second contact part of the movable part may contact the power supply part of the first extension part and the power supply part of the second extension part in the bending part of the rail, the contact of the second contact part may be released when the movable part is slid along the first extension part, and the contact of the first contact part may be released when the movable part is slid along the second extension part.

A plurality of wires, each having a positive electrode and a negative electrode, may be connected to the first contact part and the second contact part, and when the power supply part contacts the first contact part or the second contact part, electric power may be supplied to the magnetic part of the movable part through a wire.

The movable part may be provided with a first voltage sensor connected to the first contact part through a wire, a second voltage sensor connected to the second contact part through a wire, and a switching part, to which the first voltage sensor and the second voltage sensor are connected through wires, the first voltage sensor and the second voltage sensor may be configured to measure voltage data of the first contact part and the second contact part, and the switching part may be configured to control connection of the first contact part or the second contact part and the magnetic part according to the voltage data measured by the first voltage sensor and the second voltage sensor.

The switching part may connect the first contact part and the magnetic part according to the voltage data measured by the first voltage sensor when the movable part is slid along the first extension part, the switching part may connect the second contact part and the magnetic part according to the voltage data measured by the first voltage sensor and the second voltage sensor when the movable part slid along the first extension part is located in the bending part of the rail, and the connection of the first contact part and the magnetic part may be released when the movable part is slid along the second extension part.

A plurality of wires, each having a positive electrode and a negative electrode, may be connected to the first contact part and the second contact part, a wire groove may extend from the first contact part and the second contact part to a central portion of an upper surface of the movable part, on the upper surface of the movable part, and the plurality of wires connected to the first contact part and the second contact part may be inserted into the wire groove to be connected.

The movable part may have a rectangular frame shape, the magnetic part may be disposed in an interior space of the frame, and the first contact part and the second contact part may be disposed on the frame to face the power supply part of the rail.

The first contact part and the second contact part may be provided with a spring part, and the spring part may be configured to apply an elastic force to the first contact part and the second contact part such that the first contact part and the second part remain attached to the power supply part of the rail.

The rail may include a bottom surface, opposite side surfaces, and an upper surface, and the power supply part may be provided on a side surface of the rail along the rail.

A fixing part formed of a material, through which a magnetism can flow, may be provided on the bottom surface of the rail, and the magnetic part provided in the movable part may be disposed to face the fixing part to form a magnetic path.

The magnetic part may be locked with the fixing part when the magnetic part and the fixing part together form a magnetic path, and the magnetic part may be unlocked from the fixing part when a magnetic path is formed only in the magnetic part.

A plurality of bearing parts may be provided on an outer surface of the movable part, the plurality of bearing parts may be supported by the bottom surface, side surface, or upper surface of the rail to be rotated, and the transverse or vertical location of the movable part may be regulated by the bearing parts when the movable part is slid.

A rail cover extending along the rail and having a slit hole may be provided on the upper surface of the rail, and a connection part connected to the movable part through the slit hole may be provided on the upper side of the rail cover.

The rail may have a rectangular ring shape and may be provided on a floor of the vehicle, and a seat, a console, or a table may be coupled to the connection part, and the seat, the console, or the table may be slid forwards/rearwards and leftwards/rightwards along the rail on the floor of the vehicle.

A plurality of wires, each having a positive electrode and a negative electrode, may be connected to the first contact part and the second contact part, the wires may pass through the slit hole from an upper end of the movable part to be connected to the seat, the console, or the table, and when the first contact part or the second contact part contacts the power supply part, electric power may be supplied to the seat, the console, or the table through the wires.

The sliding unit for a vehicle according to the present disclosure is advantageous in that a locking mechanism is implemented by using a magnetic part such that a movable part can slide along a simple and slim rail and can be locked with or unlocked from the rail, the movable part can be coupled to various devices other than seats, electric power is supplied from the rail to the magnetic part, a seat, a console, or a table, and the sliding unit is widely available inside the vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
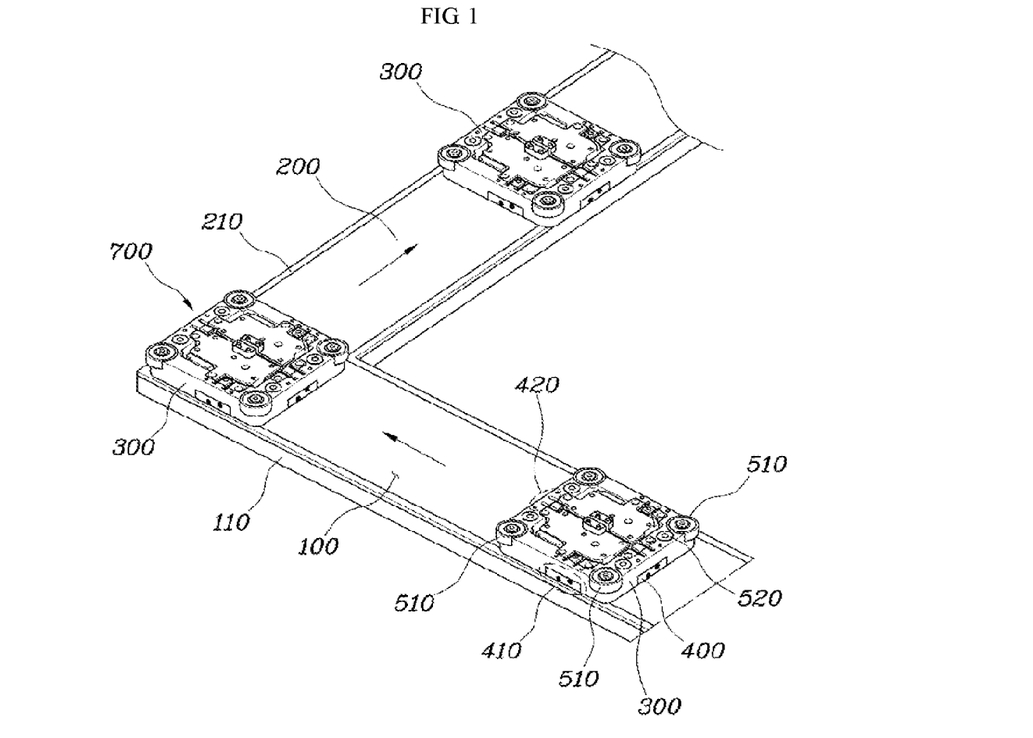
FIG. 1 is a view illustrating a state in which a movable part seated on a rail is moved along the rail in a sliding unit for a vehicle according to an embodiment of the present disclosure.
Figure 2:
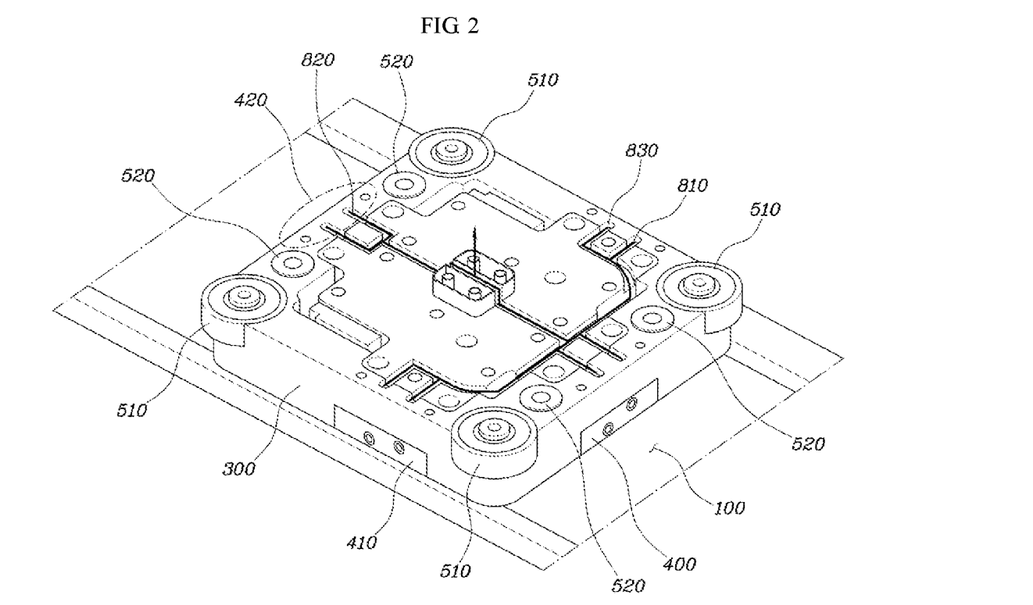
FIG. 2 is a view illustrating the movable part seated on the rail in the sliding unit for the vehicle according to the embodiment of the present disclosure.

FIG. 1 is a view illustrating a state in which a movable part seated on a rail is moved along the rail in a sliding unit for a vehicle according to an embodiment of the present disclosure. FIG. 2 is a view illustrating the movable part seated on the rail in the sliding unit for the vehicle according to the embodiment of the present disclosure.

Figure 3:
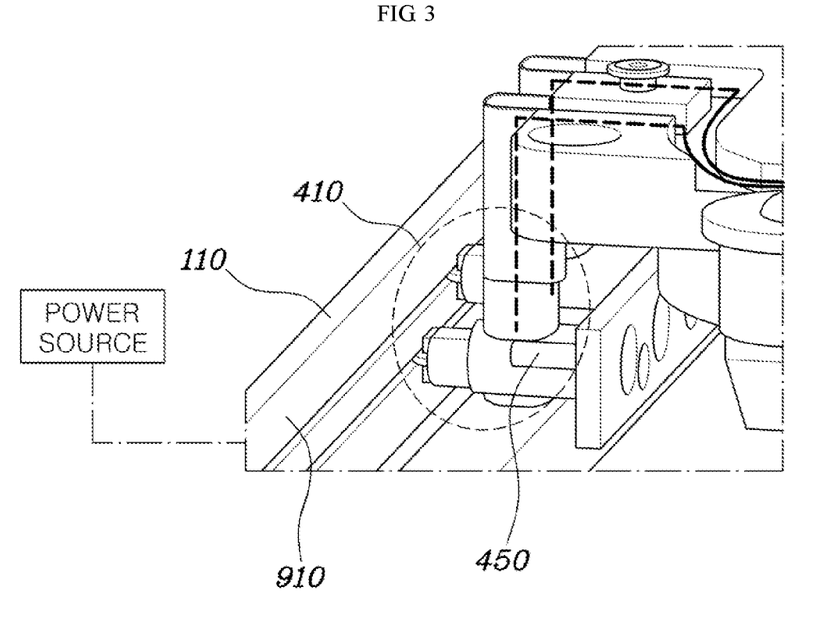
FIG. 3 is a view illustrating a first contact part in the sliding unit for the vehicle according to the embodiment of the present disclosure.
Figure 4:
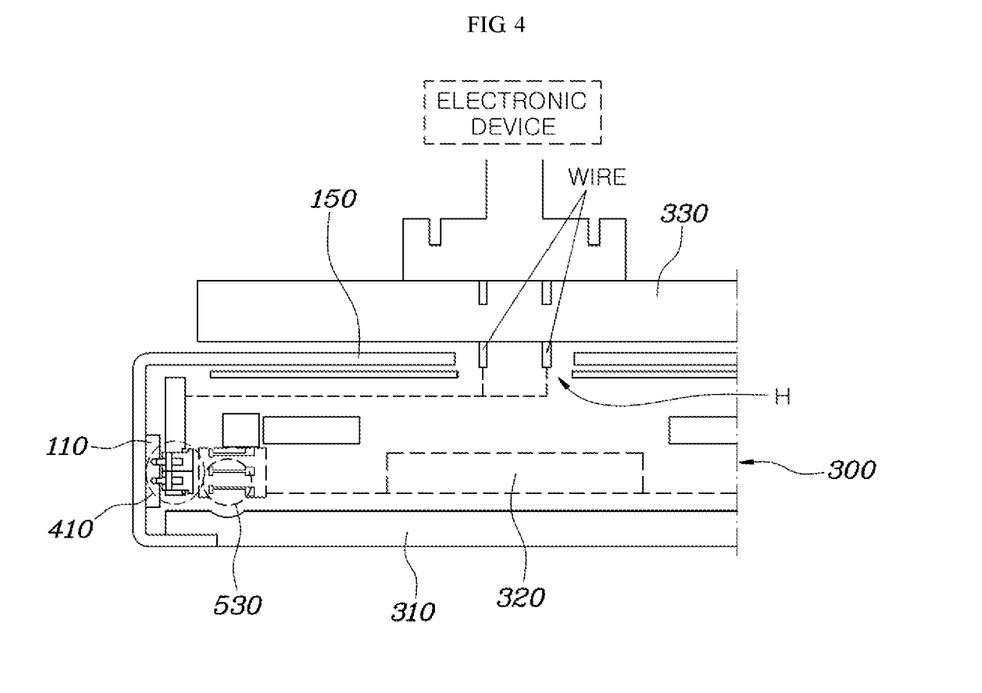
FIG. 4 is a side view illustrating the movable part seated on the rail in the sliding unit for the vehicle according to the embodiment of the present disclosure.
Figure 5:
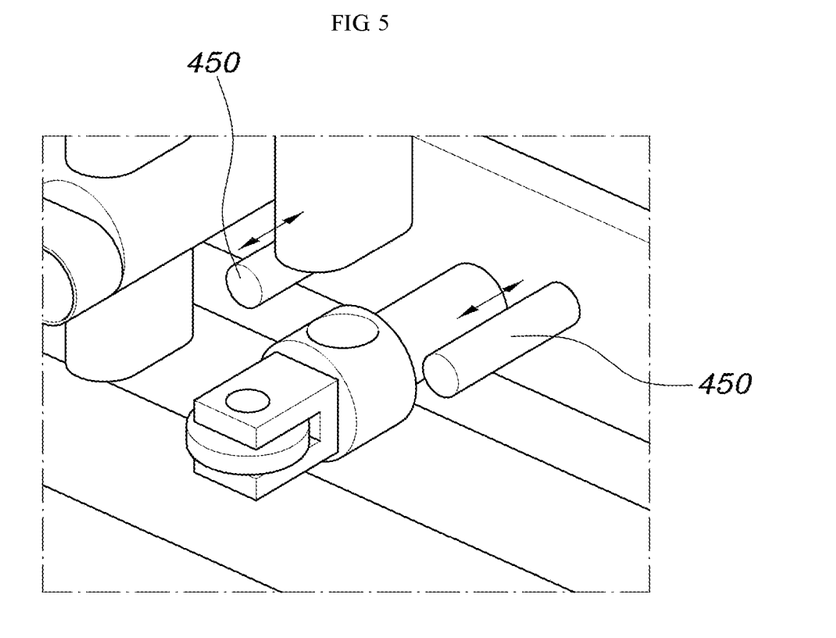
FIG. 5 is a view illustrating a spring part provided in a first contact part or a second contact part in the sliding unit for the vehicle according to the embodiment of the present disclosure.
Figure 6:
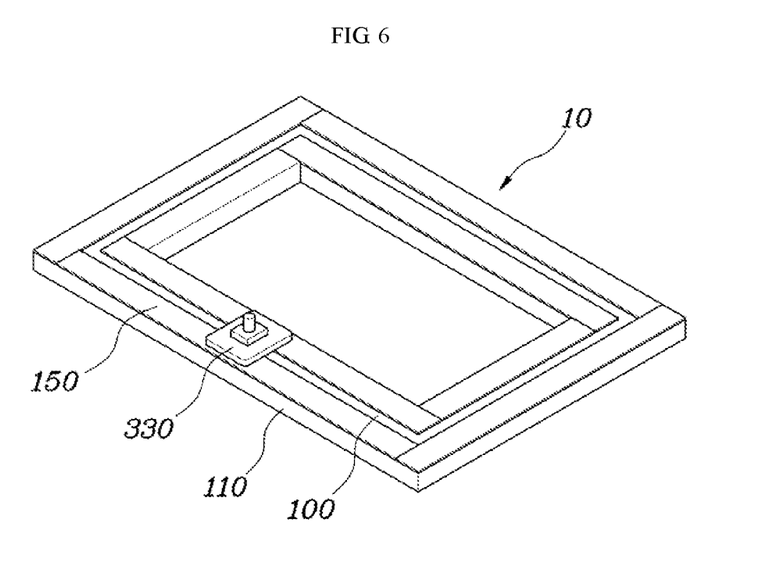
FIG. 6 is a view illustrating a rail having a rectangular ring shape and the movable part seated on the rail in the sliding unit for the vehicle according to the embodiment of the present disclosure.
Figure 7:
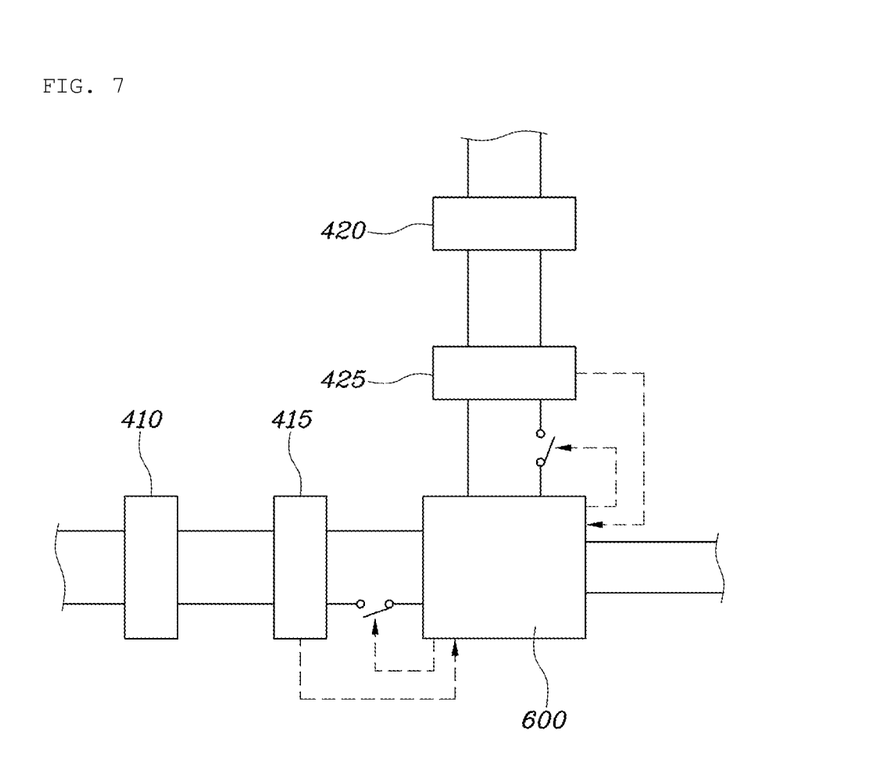
FIG. 7 is a view illustrating a voltage sensor and a switching part provided in the movable part in the sliding unit for the vehicle according to the embodiment of the present disclosure.

FIG. 3 is a view illustrating a first contact part in the sliding unit for the vehicle according to the embodiment of the present disclosure. FIG. 4 is a side view illustrating the movable part seated on the rail in the sliding unit for the vehicle according to the embodiment of the present disclosure. FIG. 5 is a view illustrating a spring part provided in a first contact part or a second contact part in the sliding unit for the vehicle according to the embodiment of the present disclosure. FIG. 6 is a view illustrating a rail having a rectangular ring shape and the movable part seated on the rail in the sliding unit for the vehicle according to the embodiment of the present disclosure. FIG. 7 is a view illustrating a voltage sensor and a switching part provided in the movable part in the sliding unit for the vehicle according to the embodiment of the present disclosure.

FIG. 1 is a view illustrating a state in which a movable part seated on a rail is moved along the rail in a sliding unit for a vehicle according to an embodiment of the present disclosure. A sliding unit for a vehicle according to an embodiment of the present disclosure includes: a rail including a first extension part 100, a second extension part 200, and a bending part 700 connecting the first extension part 100 and the second extension part 200; a movable part 300 seated on the rail to be slid along the rail, and including a magnetic part 320 locked with or unlocked from the rail; first and second power supply parts 110 and 210 provided in the rail, having a shape extending in the lengthwise direction thereof along a direction, in which the rail extends, and electrically connected to a power source (not shown) of the vehicle; and a first contact part 410 and a second contact part 420 provided in the movable part 300, and electrically connecting the first and second power supply parts 110 and 210 and the magnetic part 320 by contacting the first and second power supply parts 110 and 210, respectively, and the first contact part 410 and the first power supply part 110 contact each other when the movable part 300 is slid along the first extension part 100, and the second contact part 420 and the second power supply part 210 of the second extension part 200 contact each other when the movable part 300 is slid along the second extension part 200. The first contact part 410 and the second contact part 420 may be provided at points that are spaced apart from each other, and the rail extends toward a predetermined direction, for example, in the lengthwise direction of the vehicle or the widthwise direction of the vehicle, on a floor of the vehicle and is bent to form a closed path.

Further, in the sliding unit for the vehicle according to the embodiment of the present disclosure, the movable part 300 sliding along the rail receives electric power from a side surface of the rail, and may smoothly receive electric power from the side surface of the rail behind the bending part even when the movable part 300 passes through the bending part of the rail and the sliding direction of the movable part is changed.

In the sliding unit for the vehicle according to the embodiment of the present disclosure, the first contact part 410 and the second contact part 420 may contact the first power supply part 110 of the first extension part 100 and the second power supply part 210 of the second extension part 200, respectively, the contact of the second contact part 420 may be released when the movable part 300 is slid along the first extension part 100, and the contact of the first contact part 410 may be released when the movable part 200 is slid along the second extension part 200.

In detail, the first contact part 410 receives electric power from the first power supply part 110 when the movable part 300 is moved along the first extension part 100, and the first contact part 410 contacts the first power supply part 110 of the first extension part 100 and the second contact part 420 contacts the second power supply part 210 of the second extension part 200 when the movable part is slid to be located in the bending part of the rail. Accordingly, when the movable part 300 is slid in the bending part along the first extension part 100 or the second extension part 200, the supply of the electric power is naturally released in the contact part in a non-contact state and the electric power is received from the pre-connected contact part of the first extension part 100 or the second extension part 200, whereby the movable part 300 may be slid along the forward/rearward or leftward/rightward direction while the electric power is not interrupted.

FIG. 2 is a view illustrating the movable part seated on the rail in the sliding unit for the vehicle according to the embodiment of the present disclosure. FIG. 3 is a view illustrating a contact part in the sliding unit for the vehicle according to the embodiment of the present disclosure. In the sliding unit for the vehicle according to the embodiment of the present disclosure, a plurality of wires (810, 820) each having a positive electrode and a negative electrode are connected to the first contact part 410 and the second contact part 420, and the first and second power supply parts 110 and 210 may supply electric power to the magnetic part of the movable part through a wire when contacting the first contact part 410 or the second contact part 420.

Further, in the sliding unit for the vehicle according to the embodiment of the present disclosure, a plurality of wires (810, 820) each having a positive electrode and a negative electrode are connected to the first contact part 410 and the second contact part 420, a wire groove 830 is formed on the upper surface of the movable part 300 from the first contact part 410 and the second contact part 420 to a central portion of the upper surface of the movable part 300, and the plurality of wires connected to the first contact part 410 and the second contact part 420 may be inserted into the wire groove 830 to be connected.

In detail, the movable part 300 has a rectangular frame shape, the rail has a rectangular ring shape provided with four bending parts and four extension parts, and one contact part is disposed on each of the surfaces of the rectangular frame of the movable part 300 such that a total of four contact parts are provided, and the contact parts are electrically connected to the first and second power supply parts 110 and 210 provided on the side surfaces of the rail when contacting the side surfaces of the rail to supply electric power to an electronic device such as a seat, a console, or a table connected to the magnetic part in the interior of the movable part or the movable part. Accordingly, any one side surface of the movable part 300 contacts the side surface of the rail even though the movable part 300 is slid after the direction of the movable part 300 is changed in the bending part, and the power supply parts 110 and 210 that supply electric power from the power source of the vehicle are provided on the side surfaces of the rail, whereby electric power is continuously supplied to an electronic device, such as a seat, a console, or a table, which is connected to the magnetic part in the interior of the movable part 300 or the movable part even when the movable part 300 is slid.

Each of the plurality of wires has a positive electrode and a negative electrode and two wires are connected to each of the contact parts 410 and 420, and accordingly, two contact points are provided in each of the contact parts 410 and 420 and each of the first and second power supply parts 110 and 210 on the side surfaces of the rail also has a shape, in which two rail grooves extend, whereby two contact points of the contact part contact the respective power supply part having the same, in which the rail grooves extend, to receive electric power.

Further, the wire groove, into which the wires may be inserted, is provided on the upper surface of the movable part 300 such that a total of eight wires, which gathers at a central portion of the movable part 300 from the four surfaces of the movable part 300, are inserted into the wire groove in the movable part 300 having a rectangular frame shape, and the wires are connected to two wires each including a positive electrode and a negative electrode at the central portion of the movable part 300. The two wires each having a positive electrode and a negative electrode protrude and extend from the central portion of the movable part 300 to an upper end of the movable part 300 to supply electric power to the seat, the console, or the table coupled to the upper end of the movable part 300.

FIG. 7 is a view illustrating a voltage sensor and a switching part provided in the movable part in the sliding unit for the vehicle according to the embodiment of the present disclosure. In the sliding unit for the vehicle according to the embodiment of the present disclosure, the movable part 300 may be provided with a first voltage sensor 415 connected to the first contact part 410 through a wire, a second voltage sensor 425 connected to the second contact part 420 through a wire, and a switching part 600, to which the first voltage sensor 415 and the second voltage sensor 425 are connected through wires, the first voltage sensor 415 and the second voltage sensor 425 may measure voltage data of the first contact part 410 and the second contact part 420, and the switching part 600 may control connection of the first contact part 410 or the second contact part 420 and the magnetic part through the voltage data measured by the first voltage sensor 415 and the second voltage sensor 425.

In detail, in the sliding unit for the vehicle according to the embodiment of the present disclosure, the switching part 600 may connect the first contact part 410 and the magnetic part through the voltage data measured by the first voltage sensor 415 when the movable part 300 is slid along the first extension part 100, the switching part 600 may connect the second contact part 420 and the magnetic part through the voltage data measured by the first voltage sensor 415 and the second voltage sensor 425 when the movable part 300 slid along the first extension part 100 is located in the bending part of the rail, and the connection of the first contact part 410 and the magnetic part may be released when the movable part 300 is slid along the second extension part 200. The switching parts 600 checks the voltages of the contact parts through the voltage sensors provided in the contact parts of the side surfaces of the movable part 300, and adjusts the switches to control the switches connected to the contact parts of the side surfaces of the rail only when the switching parts 600 are properly connected to the first and second power supply parts 110 and 210 on the side surfaces of the rail.

The movable part 300 is connected to two contact parts in each of the bending parts of the rail, and then, when the rail in turn is slid along any one extension part, the switching part 600 determines whether the magnetic part is properly connected to the first or second power supply part 110 or 210 of the side surface of the rail extending in a direction, in which the magnetic part is slid, through the voltage sensor, and when the magnetic part is properly connected to the first or second power supply part 110 or 210 on the surface of the rail extending in a direction, in which the magnetic part is slid, the connection of the side surface of the rail extending in a direction, in which the magnetic part is not slid, with the first or second power supply part 110 or 210 is interrupted. An error signal may be sent to a passenger when the contact part is not properly connected to the first or second power supply part 110 or 210 on the side surface of the rail extending in a direction, in which the magnetic part is slid, and thereafter, the sliding of the movable part 300 may be restricted such that the existing connection the surface of the rail and the first or second power supply part 110 or 210 is maintained and the contact of the contact part of the movable part 300 with the first or second power supply part 110 or 210 on the side surface of the rail is not released.

FIG. 5 is a view illustrating a spring part provided in a first contact part or a second contact part in the sliding unit for the vehicle according to the embodiment of the present disclosure. In the sliding unit for the vehicle according to the embodiment of the present disclosure, spring parts 450 may be provided in the first contact part 410 and the second contact part 420, and the spring parts 450 may apply an elastic force to the first contact part 410 and the second contact part 420 so that the first contact part 410 and the second contact part 420 are attached to the first and second power supply parts 110 and 210. Because the contact parts provided in the movable part 300 contact the first and second power supply parts 110 and 210 provided on the side surfaces of the rail to receive electric power, electric power is interrupted if the contact with the first or second power supply part first or second is released. Accordingly, the spring parts 450 can prevent the contact from being released and the electric power from being interrupted.

FIG. 4 is a side view illustrating the movable part seated on the rail in the sliding unit for the vehicle according to the embodiment of the present disclosure. In the sliding unit for the vehicle according to the embodiment of the present disclosure, the movable part 300 may have a rectangular frame shape, the magnetic part 320 is disposed in the interior space of the frame, and the first contact part 410 and the second contact part 420 may be disposed on the frame to face the first and second power supply parts 110 and 210 of the rail. One contact part is disposed on each of the surface of the rectangular frame such that a total of four contact parts are provided, and the contact parts contact the first and second power supply parts 110 and 210 on the side surfaces of the rail to be connected to the magnetic parts 320 through the wires so that electric power is supplied to the magnetic parts 320.

Because the sliding unit for the vehicle according to the embodiment of the present disclosure employs a locking mechanism using the magnetic parts 320, the structure of the sliding unit is simple, the space for the rail is minimized, and the space can be efficiently used in the interior of the vehicle. In detail, the locking mechanism of the existing rail generally includes a type using a lead screw and a forking type, and when a seat is locked in this manner, the height of the rail has an excessive length of 47 mm or 57 mm. When the height of the rail is excessive, the rail occupies much of the limited space on the floor of the vehicle so that there is difficult in efficiently using the space. Accordingly, the sliding unit for the vehicle according to the embodiment of the present disclosure employs a new locking mechanism using the magnetic parts 320 to realize a rail of a slim structure having a rail height of about 30 mm.

Meanwhile, the rail of the sliding unit for the vehicle according to the embodiment of the present disclosure has a bottom surface, opposite side surfaces, and an upper surface, and the first and second power supply parts 110 and 210 may be provided on the respective side surfaces of the rail along the rail. In the sliding unit for the vehicle according to the embodiment of the present disclosure, a fixing part 310 formed of a material, through which a magnetism flows, is provided on a bottom surface of the rail, and the magnetic part 320 provided in the movable part 300 is disposed to face the fixing part 310 to form a magnetic path. In the sliding unit for the vehicle according to the embodiment of the present disclosure, the magnetic part 320 may be locked with the fixing part 310 when the magnetic part 320 and the fixing part 310 form a magnetic path together, and the magnetic part 320 may be unlocked from the fixing part 310 when the magnetic path is formed only in the magnetic part 320.

The magnetic part 320 may include a fixing permanent magnet having a ring shape, contacting the fixing part 310, and provided in the magnetic part 320 on a side that is close to the fixing part 310, and an electromagnet provided in the magnetic part 320 on a side that is opposite to the fixing part 310, and the magnetic part 320 may be locked with or unlocked from the fixing part 310 as the polarity of the electromagnet changes. In other words, the magnetic part 320 applies a current to the electromagnet to form a magnetic path, and the magnetic path formed in the magnetic part 320 changes as the polarity of the electromagnet changes.

In detail, when the polarity of the electromagnet at an adjacent portion to the fixed permanent magnet is formed to have the same polarity as the adjacent fixed permanent magnet by applying a current to the electromagnet, the magnetic path is formed to pass through the magnetic part 320 and the fixing part 310 together, and accordingly, the magnetic part 320 is locked with the fixed part 310 and the movable part 300 is fixed to the rail. In detail, when the polarity of the electromagnet at an adjacent portion to the fixed permanent magnet is formed to have the opposite polarity to the adjacent fixed permanent magnet by applying a current to the electromagnet, the magnetic path is formed to pass through only the magnetic part 320 and not to pass through the fixing part 310, and accordingly, the magnetic part 320 is unlocked from the fixed part 310 and the movable part 300 is released from the rail.

Further, after the magnetic part 320 is locked with or unlocked from the fixing part 310 as a current is applied to the electromagnet to form the magnetic path, the preformed magnetic path is maintained even when the application of the current is stopped, and a state in which the magnetic part 320 is locked with or unlocked from the fixing part 310 is maintained. Accordingly, when a locking mechanism is realized in the rail by using the magnetic part 320, consumption of electric power can be also minimized because a current has to be supplied only at a moment at which the magnetic part 320 is locked or unlocked.

Meanwhile, in the sliding unit for the vehicle according to the embodiment of the present disclosure, a plurality of bearing parts 510, 520, and 530 are provided on the outer surface of the movable part 300, the bearing parts 510, 520, and 530 are supported on the bottom surface, the side surfaces, or the upper surface of the rail to be rotated, and the leftward/rightward or upward/downward location of the movable part 300 can be regulated by the bearing parts 510, 520, and 530 when the movable part 300 is slid. Further, in the sliding unit for the vehicle according to the embodiment of the present disclosure, a rail cover 150 extending along the rail and having a slit hole H may be provided on the upper surface of the rail, and a connection part 330 passing through the slit hole H and connected to the movable part 300 may be provided on the upper side of the rail cover 150.

In detail, in the sliding unit for the vehicle according to the embodiment of the present disclosure, the bearing part is a side bearing 510 located at an apex of the movable part 300 having a rectangular frame shape, the leftward/rightward location of the side bearing 510 is supported by a side surface of the rail, and the leftward/rightward location of the movable part 300 can be regulated by the side bearing 510 when the movable part 300 is slid. A total of four side bearings 510 are disposed at the apexes of the side surfaces of the rectangular frame and are supported by the side surfaces of the rail to be rotated, and the lower location of the movable part 300 can be regulated when the movable part 300 is slid and the leftward/rightward eccentricity of the movable part 300 can be prevented.

Further, in the sliding unit for the vehicle according to the embodiment of the present disclosure, the bearing part is an upper bearing 520 located on the upper surface of the movable part 300 having a rectangular frame shape, the upper bearing 520 is supported by the upper surface of the rail, and the upper location of the movable part 300 can be regulated by the upper bearing 520 when the movable part 300 is slid. A total of four upper bearings 520 are disposed at the apexes of the upper surfaces of the rectangular frame, and are supported by the rail cover covering the upper surfaces of the rail to be rotated, and the upper location of the movable part 300 is regulated when the movable part 300 is slid.

In the sliding unit for the vehicle according to the embodiment of the present disclosure, the bearing part is a lower bearing 530 located on the lower surface of the movable part 300 having a rectangular frame shape, the lower location of the lower bearing 530 is supported by the lower surface of the rail to be rotated, and the lower location of the movable part 300 can be regulated by the side bearing 530 when the movable part 300 is slid. A total of four lower bearings 530 are disposed at the apexes of the lower surfaces of the rectangular frame, and are supported by the lower surface of the rail or the fixing part 110 to be rotated, and the lower location of the movable part 300 is regulated when the movable part 300 is slid. Accordingly, the movable part 300 that occupies a minimum space, the magnetic parts 320, and the plurality of bearing parts 510, 520, and 530 are located in the interior space of the rail, and the movable part 300 is connected to the connection part 330 passing through the slit hole provided in the rail cover 150 to realize a simple and slim rail.

FIG. 6 is a view illustrating a rail 10 having a rectangular ring shape and the movable part seated on the rail 10 in the sliding unit for the vehicle according to the embodiment of the present disclosure. In the sliding unit for the vehicle according to the embodiment of the present disclosure, the rail 10 has a rectangular ring shape and is provided on the floor of the vehicle, and a seat, a console, or a table is coupled to the connection part 330 so that the seat, the console, or the table can be slid forwards and rearwards and leftwards and rightwards on the floor of the vehicle.

In the sliding unit for the vehicle according to the embodiment of the present disclosure, a plurality of wires each having a positive electrode and a negative electrode are connected to the first contact part 410 and the second contact part 420, and the wires pass through the slit hole from the upper end of the movable part 300 to be connected to the seat, the console, or the table, and the first contact part 410 or the second contact part 420 may supply electric power to the seat, the console, or the table when contacting the first and second power supply part 110 and 220.

Accordingly, the seat, the console, or the table is coupled to the connection part 330 connected to the movable part 300 to be moved together with the movable part 300 as the movable part 300 is slid forwards and rearwards and leftwards and rightwards along the rail, and may be locked with or unlocked from the fixing part 310 by using the magnetic part 320, and may be electrically connected to the four contact parts on the side surfaces of the movable part having a rectangular frame shape electrically connected to the first and second power supply parts 110 and 210 on the respective side surfaces of the rail having a rectangular ring shape connected to the power source of the vehicle to receive and utilize electric power.

Meanwhile, in the sliding unit for the vehicle according to the embodiment of the present disclosure, the rail has a rectangular ring shape and is provided on the floor of the vehicle, and the movable part 300 has a rectangular shape and may be slid forwards and rearwards and leftwards and rightwards on the floor of the vehicle. Further, in the sliding unit for the vehicle according to the embodiment of the present disclosure, a seat, a console, or a table is coupled to the movable part 300 so that the seat, the console, or the table can be slid forwards and rearwards and leftwards and rightwards on the floor of the vehicle. The movable part 300 is slid forwards and rearwards and leftwards and rightwards along the rail having a rectangular ring shape, and is electrically connected to the first and second power supply parts 110 and 210 located on the respective side surfaces of the rail when the movable part having a rectangular frame shape is slid through the contact parts located on the side surfaces of the movable part 300 so that electric power can be continuously supplied to the seat, the console, or the table coupled to the upper end of the magnetic part 320 or the movable part 300.

In this way, through the simple and slim structure of the sliding unit for the vehicle according to the embodiment of the present disclosure, another device of the vehicle, such as a seat, a console, or a table can be conveniently coupled to the upper end of the rail to be slid. Moreover, when autonomous vehicles are commercialized in the future, the concept of the driver's seats will disappear and the necessity of the utilization of the interior space of the vehicle will become important, and by using the sliding unit for the vehicle according to the embodiment of the present disclosure, devices such as a seat, a console, and a table in the vehicle can be conveniently slid forwards and rearwards and leftwards and rightwards, whereby it is expected that a necessary space can be easily secured.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A sliding unit for a vehicle, comprising:
   a rail comprising a first extension part, a second extension part, and a bending part connecting the first extension part and the second extension part in a way that the first and second extension parts are perpendicularly connected to each other;
   a movable part slidably disposed on the rail along the rail, the movable part comprising a magnetic part configured to be locked with or unlocked from the rail;
   a power supply part disposed in the rail, having a shape extending in a lengthwise direction along the rail, and electrically connected to a power source; and
   a first contact part and a second contact part disposed in the movable part, the first and second contact parts electrically connecting the power supply part and the magnetic part by contacting the power supply part,
   wherein the power supply part includes a first power supply part disposed on the first extension part and a second power supply part disposed on the second extension part,
   wherein the first contact part and the first power supply part contact each other when the movable part is slid along the first extension part, and
   wherein the second contact part and the second power supply part contact each other when the movable part is slid along the second extension part.

2. The sliding unit of claim 1, wherein the first contact part and the second contact part are configured to contact the first power supply part and the second power supply part, respectively, in the bending part of the rail,
   wherein, when the movable part is slid along the first extension part, a contact between the second contact part and the second power supply part is released, and
   wherein, when the movable part is slid along the second extension part, a contact between the first contact part and the first power supply part is released.

3. The sliding unit of claim 1, wherein a plurality of wires, each having a positive electrode and a negative electrode, are connected to the first contact part and the second contact part, and
   wherein, when the first power supply part contacts the first contact part or the second power supply part contacts the second contact part, electric power is supplied to the magnetic part of the movable part through the plurality of wires.

4. The sliding unit of claim 3, wherein the movable part includes:
   a first voltage sensor connected to the first contact part through the plurality of wires;
   a second voltage sensor connected to the second contact part through the plurality of wires; and
   a switching part, to which the first voltage sensor and the second voltage sensor are connected through the plurality of wires,
   wherein the first voltage sensor and the second voltage sensor are configured to measure voltage data of the first contact part and the second contact part, respectively, and
   wherein the switching part is configured to control connection of the first contact part or the second contact part and the magnetic part according to the voltage data measured by the first voltage sensor and the second voltage sensor.

5. The sliding unit of claim 4, wherein the switching part is configured to connect the first contact part and the magnetic part according to the voltage data measured by the first voltage sensor when the movable part is slid along the first extension part,
   wherein the switching part connects the second contact part and the magnetic part according to the voltage data measured by the first voltage sensor and the second voltage sensor when the movable part slid along the first extension part is located in the bending part of the rail, and
   wherein a connection between the first contact part and the magnetic part is released when the movable part is slid along the second extension part.

6. The sliding unit of claim 1, further comprising:
   a plurality of wires, each having a positive electrode and a negative electrode, connected to the first contact part and the second contact part; and
   a wire groove extending, on an upper surface of the movable part, from the first contact part and the second contact part to a central portion of the upper surface of the movable part,
   wherein the plurality of wires connected to the first contact part and the second contact part are extend through the wire groove.

7. The sliding unit of claim 1, wherein the movable part has a rectangular frame shape,
   wherein the magnetic part is disposed in an interior space of the movable part, and
   wherein the first contact part and the second contact part are disposed on the movable part and face the first power supply part and the second power supply part, respectively.

8. The sliding unit of claim 1, wherein each of the first contact part and the second contact part include a spring part configured to apply an elastic force to the first contact part and the second contact part such that the first contact part and the second part remain attached to the first power supply part and the second power supply part, respectively.

9. The sliding unit of claim 1, wherein the first and second power supply parts are disposed on side surfaces of the rail, respectively, along the rail.

10. The sliding unit of claim 9, wherein a fixing part composed of a material, through which a magnetism can flow, is disposed on the bottom surface of the rail, and
    wherein the magnetic part disposed in the movable part is disposed to face the fixing part, defining a magnetic path.

11. The sliding unit of claim 10, wherein the magnetic part is configured to be locked with the fixing part when the magnetic part and the fixing part together form the magnetic path, and the magnetic part is configured to be unlocked from the fixing part when the magnetic path is formed only in the magnetic part.

12. The sliding unit of claim 9, wherein a plurality of bearing parts are: (i) disposed on an outer surface of the movable part,
   (ii) to be rotatably supported by the rail, and
   (iii) to control a movement of the movable part in a transverse or vertical direction when the movable part is slid.

13. The sliding unit of claim 9, further comprising:
a rail cover having a slit hole and extending along the rail on the upper surface of the rail; and
a connection part connected to the movable part through the slit hole on an upper side of the rail cover.

14. The sliding unit of claim 13, wherein the rail has a rectangular ring shape, and wherein the connection part is configured to couple an electronic device thereon such that the electronic device moves in a forward, rearward, leftward, and rightward direction along the rail with the connection part.

15. The sliding unit of claim 14, further comprising a plurality of wires, each having a positive electrode and a negative electrode, are connected to the first contact part and the second contact part, wherein the plurality of wires pass through the slit hole from an upper end of the movable part to be connected to the electronic device, and wherein, when the first contact part or the second contact part contacts the first power supply part or the second power supply part, respectively, electric power is supplied to the electronic device through the plurality of wires.

* * * * *